United States Patent [19]

Young

[11] Patent Number: 4,870,625
[45] Date of Patent: Sep. 26, 1989

[54] MARINE SHEAR-WAVE DETECTION SYSTEM USING SINGLE MODE REFLECTION BOUNDARY CONVERSION TECHNIQUE

[75] Inventor: Dewey R. Young, Houston, Tex.; Richard C. Swenson, Carriere, MS

[73] Assignee: Exxon Production Research Company, Houston, Tex.

[21] Appl. No.: 249,500

[22] Filed: Sep. 26, 1988

[51] Int. Cl.⁴ .................... G01V 1/38; G01V 1/047
[52] U.S. Cl. ........................ 367/16; 367/75; 367/165; 181/401
[58] Field of Search .................... 367/16, 17, 19, 75, 367/106, 130, 165; 181/112, 110, 401

[56] References Cited

U.S. PATENT DOCUMENTS

| H462 | 4/1988 | Zibilich | 367/75 |
|---|---|---|---|
| Re. 23,552 | 9/1952 | Babb et al. | 367/16 |
| 2,283,200 | 5/1942 | Flude . | |
| 2,551,417 | 5/1951 | Carlisle . | |
| 2,590,531 | 3/1952 | McLoad . | |
| 2,729,300 | 1/1956 | Paslay . | |
| 2,738,488 | 3/1956 | MacKnight . | |
| 2,780,301 | 2/1957 | Jakosky | 367/16 |
| 2,880,816 | 4/1959 | Widess . | |
| 3,275,097 | 9/1966 | Pavey, Jr. . | |
| 3,921,755 | 11/1975 | Thigpen | 181/112 |
| 3,934,218 | 1/1976 | Babb . | |
| 3,954,154 | 5/1976 | Kruppenbach et al. | 181/112 |
| 4,038,631 | 7/1977 | Murphy . | |
| 4,078,223 | 3/1978 | Strange . | |
| 4,281,402 | 7/1981 | Kruka et al. | 367/17 |
| 4,387,450 | 6/1983 | Zachariadis . | |
| 4,397,005 | 8/1983 | Gassaway | 367/36 |
| 4,446,538 | 5/1984 | Zachariadis | 367/19 |
| 4,528,649 | 7/1985 | Gassaway et al. | 367/36 |
| 4,705,137 | 11/1987 | Fair | 367/75 |
| 4,725,990 | 2/1988 | Zibilich | 367/19 |

FOREIGN PATENT DOCUMENTS

PCT84/00731 5/1984 PCT Int'l Appl. .

Primary Examiner—Nelson Moskowitz
Attorney, Agent, or Firm—Vaden, Eickenroht, Thompson & Boulware

[57] ABSTRACT

A hydrostreamer includes connectors for joining to depending housings enclosing geophone sensors. These sensors are coupled to the bottom of the sea via such housings by the housings being appropriately weighted and externally surface serrated. Thus, the geophones detect s-waves directly from the ground in single-mode conversion fashion while simultaneously, hydrophones in the hydrostreamers detect p-wave reflections in traditional fashion.

9 Claims, 5 Drawing Sheets

MARINE SHEAR-WAVE DETECTION SYSTEM USING SINGLE MODE REFLECTION BOUNDARY CONVERSION TECHNIQUE

BACKGROUND OF THE INVENTION

1. Field of the Invention

This invention relates to marine seismic surveys and more particularly to marine seismic surveys utilizing shear wave boundary reflections.

2. Description of the Prior Art

Conventional marine seismic surveys are developed utilizing one or more marine seismic sources and one or more streamer receiving cables having a plurality of hydrophones or hydrophone arrays spaced therealong at predetermined intervals. The seismic sources are conventionally towed by the same or different marine vessel towing the streamer cables, the sources being towed at a shallow depth beneath the sea's surface to avoid excessive interference from the water-to-air interface or boundary. Likewise, the streamer cables are towed beneath the surface to avoid excessive interference from the surface boundary. The streamer cables are usually towed so that they attain a predetermined attitude, usually parallel to the water's surface.

Each hydrophone or hydrophone array constitutes a suitable detector or receiver of compressional seismic waves propagated through the water as a result of sourcing events. Although there are some refracted compressional waves, these are generally discriminated against in favor of receiving the reflected compressional wave by the alignment of the pressure sensitive elements in the hydrophones. Reflective compressional waves are generally referred to as "p waves", the "p" standing for pressure.

It is well known that geologic boundaries including the sea's bottom and deeper subsurface terrain boundaries, reflect an incident seismic wave from a sourcing event to produce a reflecting p wave or p-wave component. The angle of reflection will generally be equal to the angle of incidence in a formation that is generally homogeneous.

Therefore, in conventional marine surveying, a seismic sourcing event initiates a compressional wave front through the water toward the subsurface terrain to be surveyed. At the sea's bottom there is some refraction of the wave front and some reflection. The refracted wave continues onward to result in sub-surface reflections at each terrain boundary. The bottom reflection is returned at the reflected angle for a p wave to be detected by the hydrophones in the streamer cable. A p-wave reflection from a subsurface boundary progresses upward to the sea's bottom, at which time the ground propagated p wave excites the water in like fashion to produce a water-propagated p wave that is eventually sensed by appropriately positioned hydrophones. From these p-wave returns, the character of the sub-surface terrain surveyed can be determined.

Land surveys, in contrast to marine surveys, utilize geophones instead of hydrophones. Geophones are velocity detectors or receivers, rather than pressure detectors, and are well-suited to detect velocity changes resulting from reflected seismic events. A geophone element is also direction sensitive to discriminate against often unwanted refracted waves. A geophone, however, is unlike a hydrophone in an additional manner, that being it is sensitive to velocity changes as opposed to pressure changes. To be an effective detector, a geophone must either be in contact with the ground surface or just below it and, therefore, be in contact with the propagation medium in which the reflection waves travel.

It is well known that meaningful and different seismic information is derived from the reflected p waves and from so called "shear" or "s" waves. In a land survey, it has long been known that particles are not only excited in an in-line (mostly vertical) direction by a seismic wave front, but also in a transverse (mostly horizontal) direction by a seismic wave front. Shear waves are detectable and can be discriminated against with respect to p waves because of their time of occurrence (slower than a p wave), their angle of reflectivity (less than the angle of reflectivity of a p wave), and by the direction of excited particle motion (which is detectable only by a receiver element oriented for such detection direction).

Shear waves result in land surveys because of the character of layers that naturally occur in the ground. Generally, when seismic energy impinges on an interface between two elastic media having different acoustic impedances, part of that energy will be transmitted across the interface, and part will be reflected back. If the energy arrives at some angle of incidence other than normal to the interface, then both the reflected and the transmitted energy will have a compressional (p-wave) component and a shear (s-wave) component. The partitioning of energy from the incident wave into these components depends upon the angle of incidence and the physical properties of the two media-specifically, their p-wave velocities, s-wave velocities, and bulk densities.

Layers do not occur in water like they do in the ground. However, that does not mean that shear waves have not been totally undetectable in a marine environment. It has meant, however, that sensitivity of detection has been greatly diminished. Because s waves do reflect at a different angle than p waves, it is possible to locate a hydrophone to be sensitive to an s wave following a mode conversion to a p wave as it propagates upward at the sea's bottom. That is, the s wave does excite the water to cause a p wave to exist when it strikes the boundary that is the sea's bottom.

The principle drawback of such detection is the loss of sensitivity in the double-mode conversion process. First, s waves are not as large as corresponding p waves at their initiation since they are a result of excitation transverse to wave propagation. At the water boundary, the direction of excitation again is not in line, but transverse, further weakening an already weak signal. As a result, although it is theoretically possible to obtain s-wave information in a marine environment, conventionally such information is foregone.

Laying a streamer cable with hydrophones on the sea's bottom for s-wave detection is not satisfactory for two reason. First, hydrophones are not sensitive to s-wave detection because they have the wrong kind of element for such detection. Their elements are pressure sensitive, not velocity sensitive. Second, a cable lying on the bottom is not sufficiently stationary or coupled to the bottom to satisfactorily detect s waves. Generally, the sea's bottom is not firm and the wave action moves the cable about so that the s waves are not detectable even if the seismic detection elements were sensitive to detect s waves.

Therefore, it is a feature of the present invention to provide an improved marine seismic detection technique capable of detecting s waves, and doing so in a single-mode conversion reflection procedure.

It is another feature of the present invention to provide an improved seismic detection technique capable of detecting s waves through the employment of suitable detectors enclosed in an improved housing coupled to the sea's bottom.

SUMMARY OF THE INVENTION

The technique described herein is for simultaneously recording compressional (p-wave) and adjacent shear (s-wave) reflections in a marine environment. The procedure involves the deployment of suitable hydrophone pressure sensors and geophone velocity sensors located within separate housings for coupling the velocity sensors to the bottom of the sea or seabed at the desirable locations for shear (s-wave) wave reception. The individual velocity sensors, each of which may comprise a plurality of sensors in an array, is sensitive to receive or detect the s-wave reflected from a geologic boundary. The s waves are distinguishable from the p waves by the generally horizontal direction of excited particle movement in the propagation medium of the geophysical formation compared with the generally vertical direction of excited p-wave particle movement. The geophone housing is appropriately ballasted to couple into the sea bottom and is surface serrated to prevent its movement under ordinary motion of the water. Each housing is physically positioned to an adjacent hydrophone streamer channel by means of a weighted and elastic connection to effect motion or acoustic decoupling. Electrical connection is made between the sensor in the housing and the communication conductors in the cable in a water-proof connection.

In a preferred use procedure, the streamer cable is deployed so that the geophones in their housing are suitably coupled to the sea bottom at the desired location for the survey. The streamer cable, which includes hydrophones or hydrophone arrays as receivers for receiving reflected p waves, is buoyed so that it rises above the sea bottom between locations where the geophone housings are located. Therefore, the hydrophones are not coupled to the bottom, but are suspended in water for proper pressure response. A marine vessel other than the vessel that deployed the streamer, towing one or more suitable airguns, waterguns or other marine sources, passes axially along or parallel to the streamer while firing the source or sources to initiate sourcing events. The geophones detect the s-wave reflections and the hydrophones detect the related p-wave reflections. The streamer then is lifted up or slid forward and redeployed for a subsequent similar pass. The housings, although serrated against movement by ordinary wave motion, do not burrow into the sea bottom in such a fashion so as to be difficult to remove.

Thus, it is possible, in a marine environment, to detect and analyze both s-wave and p-wave reflective components in a manner comparable to land surveys with only single mode conversion of the s-wave components.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope, for the invention may admit to other equally effective embodiments.

In the drawings.

DESCRIPTION OF THE PREFERRED EMBODIMENTS

Figures 1, 2:
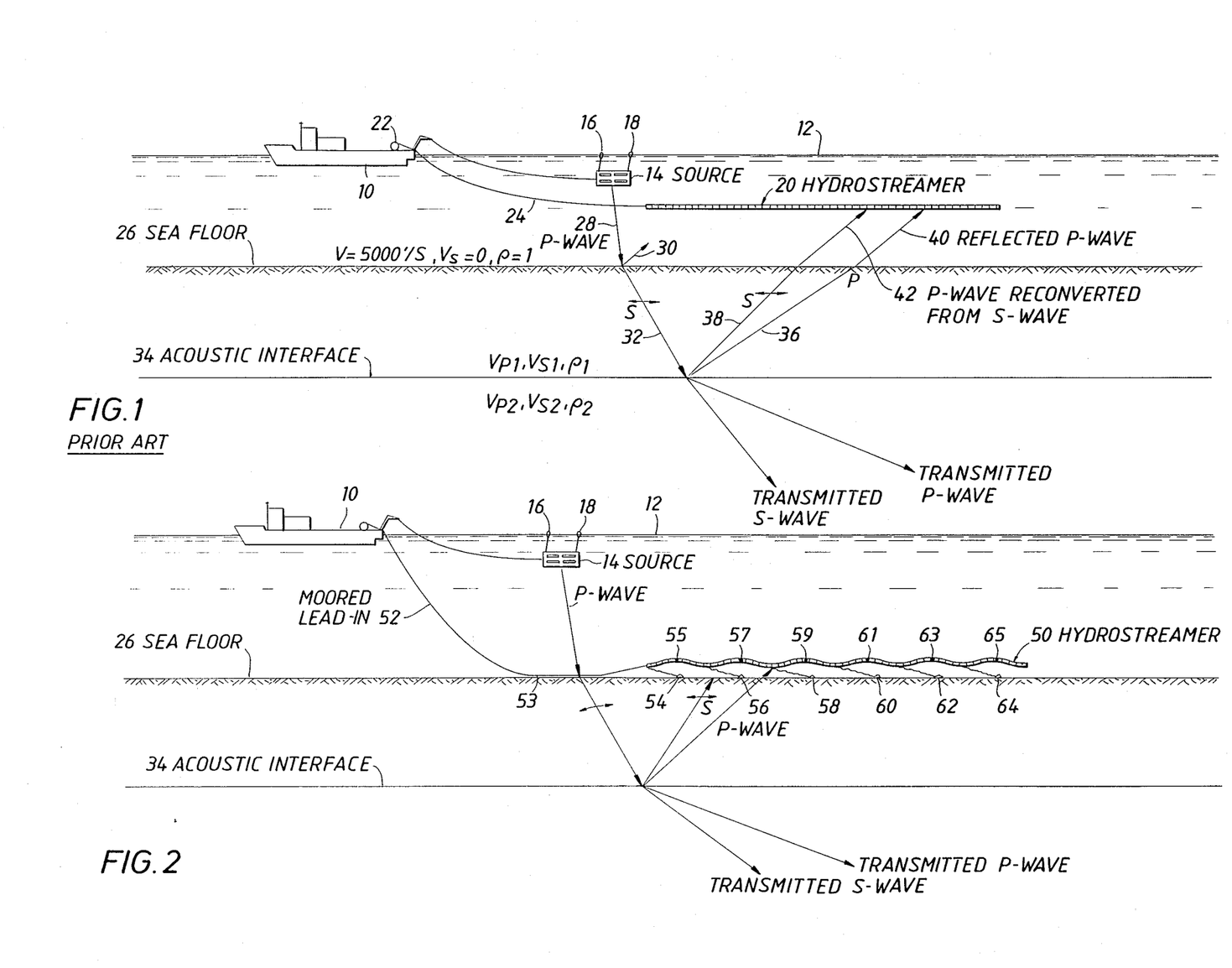
FIG. 1 is a schematic pictorial of a conventional marine seismic survey as conducted in the prior art.
FIG. 2 is a schematic pictorial of a marine survey conducted in accordance with a preferred embodiment of the present invention.

Now referring to the drawings, and first to FIG. 1, a marine vessel 10 is shown moving from right to left on surface 12 of the sea. A suitable seismic source 14, such as one or more airguns or waterguns or the like, is towed by vessel 10, buoys 16 and 18 or the like maintaining the vertical position of source 14 below the surface of the sea a short distance, normally about six meters. The compressional (p-wave) source is positioned sufficiently behind the vessel and beneath the surface of the water to be free of interfering water turbulence resulting from vessel movement and surface wave action.

Vessel 10 is also shown towing a streamer cable or hydrostreamer 20. A reel or winch 22 on the vessel provides the towing and deploying mechanism for cable 20. Cable 20 construction is well-known in the art, but is a somewhat complex structure. Generally, the cable routinely includes a plurality of cable sections, each one on the order of 30 meters in length. Included in the cable and located along its length, typically at on the order of 3-5 meter intervals, are a plurality of hydrophone detectors or receivers. Each detector or receiver generally is comprised of an array of about fifteen individual sensing elements for detecting the so-called p waves coming from below for the purpose explained herein. The cable also includes buoyancy means along its length and appropriate fairings along its length so that it conventionally assumes a horizontal attitude in the sea at a depth somewhat below the sea's surface. The depth may be deeper than the source's towing depth, but it is generally on the same order of magnitude. Finally, the cable includes communication conductors for appropriately activating the receivers and for transmitting signals following their detection and conversion to electrical energy to the vessel. An umbilical cable 24 can be used for connecting the cable to the vessel or the cable itself can be used without an umbilical or lead-in cable, if desired.

Source 14, when activated, initiates a downwardly directed compressional wave into the sea that produces a transmitted p-wave 28 toward the sea floor or bottom 26. The sea bottom constitutes an acoustical reflecting boundary or interface since it is the interface between the sea water and the ground beneath. Therefore, when the p-wave strikes bottom 26, there is produced a reflected wave 30 at an angle of reflection roughly corresponding to the angle of incidence of wave 28. A portion of wave 28 is s-wave mode converted and produces a continuing wave front 32. Wave front 32 traveling in the subsurface terrain produces both p-wave and s-wave in its wake in accordance with well-known principles. In the simplified terrain drawing of FIG. 1, at the next lower reflecting geologic boundary or accoustical interface 34, two reflecting waves of interest are produced, namely, p-wave reflection 3,, at a reflection angle approximately equally the angle of incidence of wave 32, and s-wave reflection 38, at a lesser or more vertical angle than that. At boundary 26, upwardly directed wave 36 excites or causes a compressional wave 40 in the seawater, which is further identified as the reflected p-wave. Also at boundary 26, wave 38 excites or causes a compressional wave 42 in the seawater, which is labeled "p-wave reconverted from s-wave". Because returning s-wave 38 is smaller in magnitude than p-wave 36 and because the particle movement thereof is 90° out of phase or transverse with respect to compressional wave 42, the amplitude of p-wave 42 is much smaller than the amplitude of p-wave 40. In fact, it is so much smaller, it is often hard to sense reliably and is usually ignored as having meaningful information content.

Now referring to FIG. 2, one embodiment of the present invention is shown, wherein a marine vessel 10 is towing a source 14 buoyed by buoys 16 and 18 so that it is out of the wake of the vessel and is below surface 12 of the sea at a depth of about six meters. A special type of hydrostreamer as hereafter more fully described is also deployed, being connected to an umbilical or moored lead-in 52. As described in further detail below, housings 54, 56, 58, 60, 62, and 64 are spaced along hydrostreamer 50 and connected thereto so as to be deployed in accoustical coupling contact with sea floor or bottom 26. The special hydrostreamer herein described with connection provisions for accepting geophone-generated signals can be referred to as a "geo-hydrostreamer". Each of the housings connected to hydrostreamer 50 encloses one or an array of geophone detectors or receivers oriented for reception of reflective s-waves in the ground. The front end of the hydrostreamer is conveniently weighted down by firehose filled with lead shot, a chain or similar weight. The hydrostreamer is buoyant and would rise above the level shown in FIG. 2 were it not for the housings being weighted and connected to sea bottom 26. Thus, between the points where the housings are connected, the hydrophones float above the bottom and thereby positions the hydrophones within the hydrostreamer in water and not in contact with the ground. This positioning permits the hydrophones 55, 57, 59, 61,63, and 65 in the respective hydrostreamer sections corresponding respectively with housings 54, 56, 58, 60, 62, and 64 to receive upwardly directed p-waves in the water from geologic reflections in the same manner as the hydrophones in hydrostreamer 20 shown in FIG. 1. Since each s-wave velocity detector location has a corresponding pressure sensitive detector location for compressional p-wave detection, correlations can be made for adjacent detectors of the two types or correlations can be made for s-waves and p-waves reflecting from the same interface points as desired (although p-wave detection for such correlation would be in a later hydrostreamer section than the geophone housing location for s-wave detections).

Figure 3:
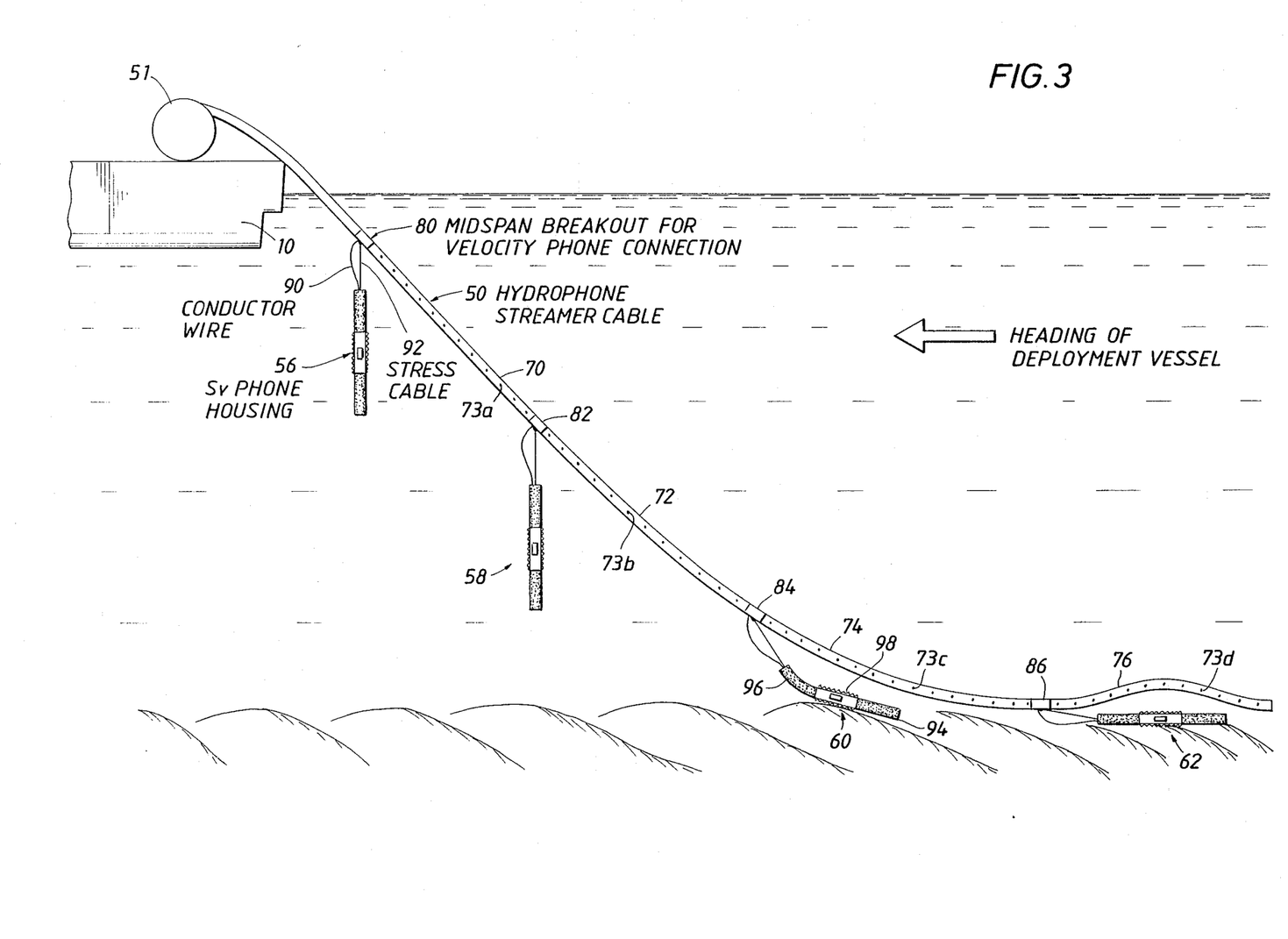
FIG. 3 is a schematic view of the deployment of seismic receivers in accordance with a preferred embodiment of the present invention.

Referring now to FIG. 3, additional details of hydrostreamer 50 and the geophone housings connected thereto are shown during deployment. Vessel 10 includes a reel or winch 51 for lowering the hydrophone assembly as the vessel moves from right to left. As noted previously, a hydrostreamer is comprised of a plurality of sections, illustrated as sections 70, 72, 74, and 76. Each section includes a plurality of hydrophones or hydrophone arrays, depicted by the dots 73a, 73b, 73c, and 73d along the hydrostreamer, and communication and power conductors for control signaling and transmitting the detected seismic signals to vessel 10. Because hydrostreamer 50 also is connected to the geophones in housings 56, 58, 60, 62, and the remainder, suitable control signal conductors therefor and communication conductors therefor are also included in hydrostreamer 50.

Where two adjacent sections of the hydrostreamer are connected, there is a connector, respectively shown as connectors 80, 82, 84, and 86 in the drawing. Each of these connectors also provides a watertight connection to protect the appropriate conductor wire or wires 90 to the housing and to a support stress cable 92, thereby keeping unnecessary weight of the housing from pulling on wires 90.

Figure 8:
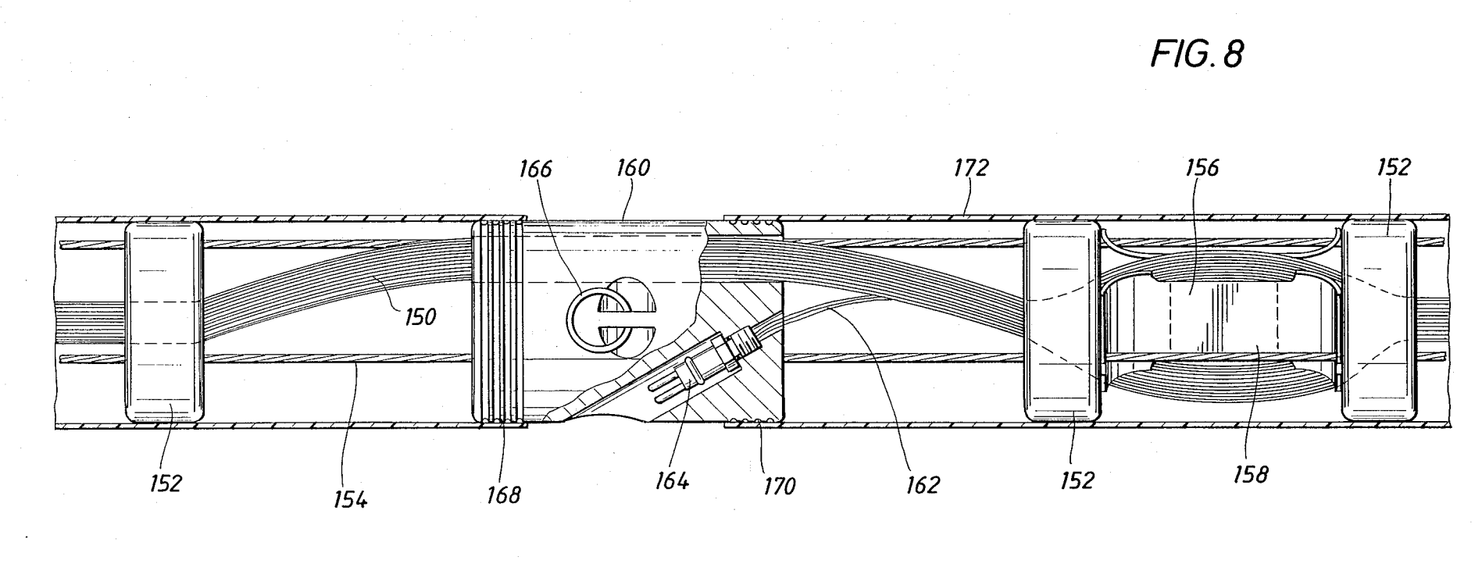
FIG. 8 is a horizontal view of a geo-hydrostreamer in accordance with the present invention, its internal components being shown in cutaway sections.

Alternatively, and preferably, there is an adapter within the geo-hydrostreamer itself that provides a connection to the conductor wire or wires 90 to the geophone housing and to support stress cable 92. Referring to FIG. 8, a portion of a hydrostreamer is shown having a large number of wire pairs generally bound together in a bundle 150 that passes through a central opening in spaced apart doughnut shaped rings 152. Also passing through the rings and attached thereto are steel wire support cables 154. Usually there are three such cables 154 spaced at regular intervals around rings 152. FIG. 8 shows a hydrophone 156 between two of the rings, the hydrophone being surrounded by a plastic guide 158 for routing the mass of the wires not operationally connected to the hydrophone around the hydrophone.

Also shown in FIG. 8 is an adaptor connector 160 having three (or other appropriate number) small holes for receiving support cables 154 and a large opening for allowing bundle 150 to pass through. One pair 162 of communication wires from the bundle are connected to adaptor connector 160 terminating in an access plug 164 for making electrical contact with a suitable plug and wire leading to the geophone housing. This plug 164 is conveniently within a protective recess. A ring 166 is provided in the outside surface of adaptor connector 160 to provide support for stress cable 92 to the geophone housing.

Adaptor connector 160 is grooved with annular rings 168 and 170 at either ends thereof. A plastic covering sheath 172 encloses all of the wire and other components within the hydrostreamer and the sheath is resiliently secured into grooved rings 168 and 170. The sheath is then filled with an appropriate substance well-known in the art to give bouyancy to the overall cable, as discussed herein.

Returning to FIG. 3, each of the geophone housings is connected to an anti-buoyancy compartment 94 at its distal end from the hydrostreamer connections and an accoustical decoupler section 96 at its proximal end. The operation of these components are described more completely below. Each of the housings has a surface that is appropriately externally grooved at grooves 98 to perfect accoustical coupling with the bottom, which surface characteristics are also described more completely below.

Figure 5:
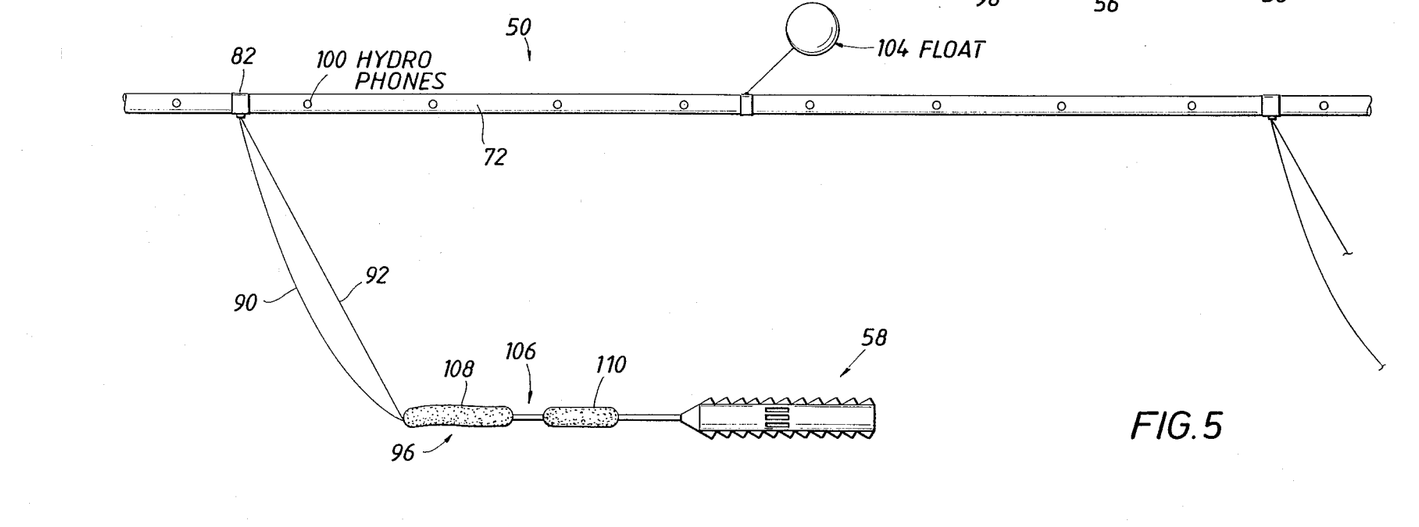
FIG. 5 is a side view of the overall shear-wave detection assembly shown attached to a streamer cable in accordance with a preferred embodiment of the present invention.

Now referring to FIG. 5, a representative section 72 of hydrostreamer or cable 50 is shown connected to a representative geophone housing assembly connected via connector 82. Section 72 is typically 30 meters long and is ballasted for positive flotation, either by ballasting provisions within the cable or externally by flotation devices such as float 104, fairings (not shown) or a combination of such ballasting means. A hydrostreamer section typically is about .07 meter in external diameter and therefore large enough to accommodate all of the needed components.

Figure 4:
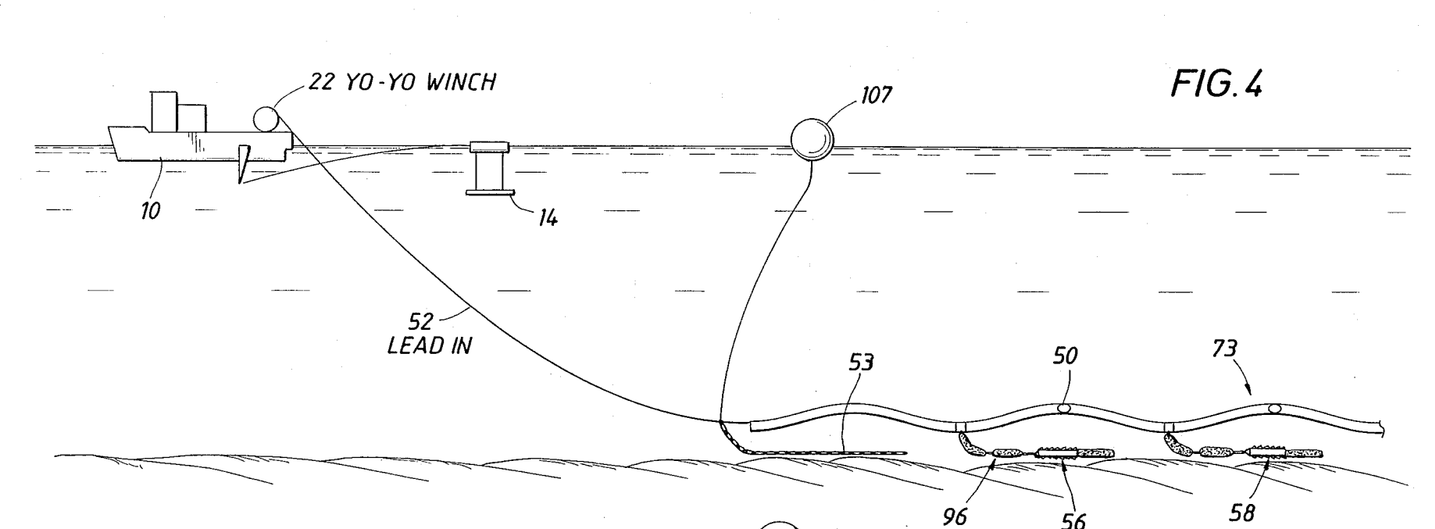
FIG. 4 is a detailed schematic pictorial of the embodiment shown in FIG. 2.

One means for decoupling housing 58 is shown in FIG. 5 in the form of multiple sections 108 and 110 of a fire-hose like casing elastically connected at dewiggler connection 106 and each including approximately 2.3 kilograms or 5 pounds of lead shot or other convenient weighting materials. That is, the overall weight of the section of the dewiggler in water will be approximately 2.3 kilograms and the weight of the geophone housing and its included components, for example, housing 58, will be approximately 4.5 kilograms or 10 pounds. Not shown in FIG. 5 is the distal ballasting portion shown in FIG. 6. A detail illustration of the deployed assembly is shown in FIG. 4. It should be noted that the lead-in umbilical section 52 is typically on the order of ten times the water depth. A visual aid 107 floating on the sea's surface conveniently marks the front end of the streamer and a heavy anchor lead-shot filled firehose 53 weighs down the front end of the hydrostreamer proper.

Figure 6:
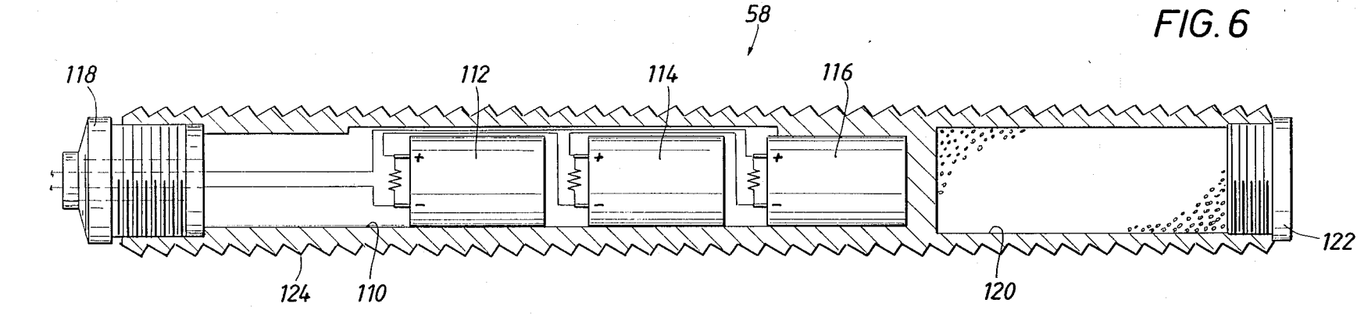
FIG. 6 is a cross-sectional view of the housing and geophone assembly in accordance with a preferred embodiment of the present invention.

A cross-sectional view of a geophone housing is shown in FIG. 6, for example housing 58. Generally, the housing includes a central compartment 110. Located within compartment 110 are three appropriately connected and arrayed geophone sensors or detectors 112, 114, and 116 suitably aligned or positioned for the detection of reflected shear waves when the housing is in coupling contact with the ground. A typical geophone that can be used in this location has a response frequency at 8 hertz, a 630 ohm coil shunted by a 1120 ohm shunt. Three separate geophones or geophone elements can be connected in series in the manner shown for a total sensitivity of 1.8 volts per inch per second. These detectors can be surrounded by oil or epoxy. On the left side of the housing, the compartment is sealed off by a screw cap 118 that seals the compartment while permitting the electrical conductors from the s-wave sensors to pass through. Cap 118 is also conveniently flanged or otherwise shaped for securing to the accoustical decoupler components shown in FIG. 5 which, in turn, joins to connection 82 of the hydrostreamer.

The distal end of the housing includes a compartment 120, which is filled with the appropriate amount of lead shot for causing the housing to rest on the ground. A cap 122 seals off this compartment. Alternatively to a compartment within the housing, the housing can be connected at its distal end to a section of fire-hose casing with weighted shot in the same fashion as the accoustical decoupling components previously described. Finally, the outside or external surface of the housing is serrated at grooves 124 so that the housing, once positioned, is resistant to wave motion that would otherwise move a housing that did not have serrations. It should be noted that preferably these grooves are not helical, which might cause them to screw themselves into a soft sea bottom and might also cause the geophone sensors to become disoriented for receiving s-wave reflections.

Figure 7:
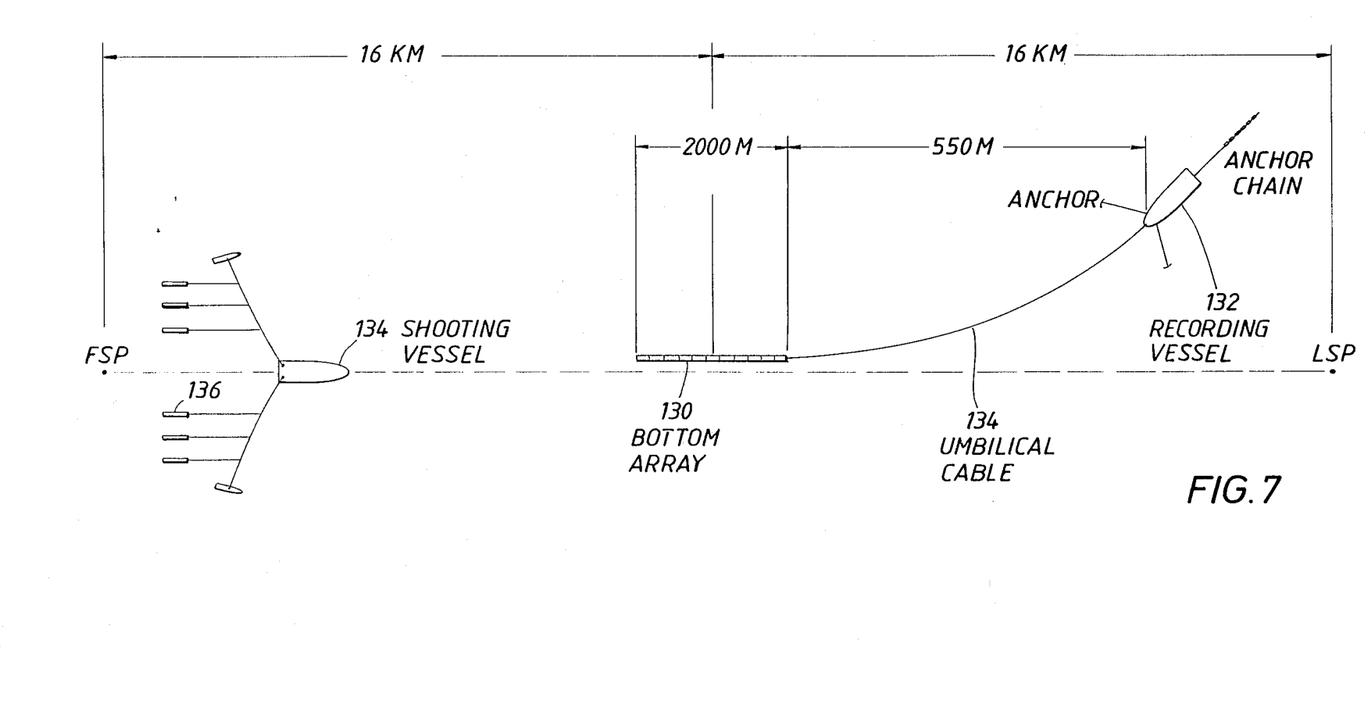
FIG. 7 is a top view of a marine seismic survey taking place in accordance with a preferred embodiment of the present invention.

FIG. 7 shows a preferred use of the apparatus in the taking of an actual survey. Since the cable with the depending housings including geophones therein is not to move during the survey, it is preferred to deploy the cable in the manner described and then anchor the marine vessel connected thereto. Thus, bottom cable array section 130, typically 2000 meters or more long is deployed by vessel 132 via umbilical cable 134. It is then anchored, preferably in at least three directions 120° from each other. The vessel is also preferably off line with cable section 130 so as not to interfere with the travel of shooting vessel 134.

Shooting vessel 134 towing one or more sources 136 then moves parallel to section 130 while appropriately activating its source or sources and initiating the compression waves into the water, as previously described. The hydrophone sensors detect the reflective p-waves and the adjacent geophone sensors detect the reflective s-waves in single mode conversion fashion, that is, by being in direct contact with the ground. Therefore, comparable information is obtained in a marine environment to that obtained for land surveys. For example, it is known that a reflective surface that reflects p-waves, but which does not reflect s-waves is symptomatic of a possible drillable pocket of hydrocarbons. Only by having s-wave information is it possible to make this relative reflection determination.

It should be noted from FIGS. 1 and 2 that the same point of reflection will produce related s-wave and p-wave reflections at different angles and, therefore reflections that are detected at different locations. It is preferred that the included angle between the initiating wave front and the s-wave be in excess of 37 degrees, for it is known that s-waves are larger in amplitude at that angle than when a smaller angle is used. Since, as noted, s-waves are not as large as p-waves, this protocol should be observed to maximize the reflective detectable s-waves in the formation under investigation.

Once the survey is taken with the cable deployed as shown in FIG. 7, it is reeled up or slid forward and redeployed in a similar fashion at the next desirable location.

While several embodiments of the invention has been shown and described, it will be understood that the invention is not limited thereto since many modifications may be made and will become apparent to those skilled in the art.

What is claimed is:

1. Apparatus for sea bottom deployment from a marine vessel for detecting the shear-wave velocity component of a seismic wave propagated form a marine seismic source following reflection of the seismic wave from a geologic boundary, said marine vessel including a cable for deploying said apparatus and for electrically conducting the detected shear-wave velocity component signals to the vessel, comprising, at least one seismic velocity receiver oriented for receiving acoustic velocity shear wave reflections and converting said reflections to electrical signals, a housing enclosing said velocity receiver external to and separated from said cable, ballast means located within said housing for causing said housing to rest on the sea bottom and thereby accoustically couple said velocity receiver to the sea bottom, serrated, not helically aligned surface means for said housing for stabilizing the lateral position of said housing with respect to its sea bottom location, weighted, elastically connected means for acoustically decoupling said housing from the cable, and electrical connector means depending from the cable for electrically connecting said velocity receiver within said housing for electrical conduction within the cable.

2. Apparatus in accordance with claim 1, wherein said velocity receiver includes an array of separate velocity elements.

3. Apparatus in accordance with claim 1, wherein said ballast means includes a compartment in said housing and removable metallic pellets located within said compartment.

4. Apparatus deployed from a marine vessel for detecting the compressional wave component and the shear-wave velocity component of a seismic source following reflection of the seismic wave from a geologic boundary, said marine vessel including a cable for deploying said apparatus and for electrically conducting the detected compressional wave component and the detected shear-wave velocity component signals to the vessel, comprising at least one seismic hydrophone included within said cable for receiving acoustic compressional wave reflections and converting said reflections to electrical signals, buoyancy means for vertically positioning the cable at said hydrophone location at a position above the sea bottom, at least one seismic velocity receiver oriented for receiving acoustic velocity shear-wave reflections and converting said reflections to electrical signals, a housing enclosing said velocity receiver external to and separated from said cable, ballast means located within said housing for causing said housing to rest on the sea bottom and thereby acoustically couple said velocity receiver to the sea bottom, serrated, not helically aligned surface means for said housing for stabilizing the lateral position of said housing with respect to its sea bottom location, weighted, elastically connected means for acoustically decoupling said housing from the cable, and electrical connector means depending from the cable for electrically connecting said velocity receiver within said housing for electrical signal conduction within the cable.

5. Apparatus in accordance with claim 4, wherein said velocity receiver includes an array of separate velocity elements.

6. Apparatus in accordance with claim 4, wherein said ballast means includes a compartment in said housing and removable metallic pellets located within said compartment.

7. The method of marine seismic surveying which comprises deploying at sea a plurality of seismic sensors, each separately enclosed in a housing suitable for coupling with the sea's bottom and having a surface sufficiently serrated and not helically aligned to maintain the housing in position under ordinary sea motion conditions while permitting ready redeployment, each of the housings being external to, dependent from, and separately connected to a marine streamer employing weighted, elastically connected means for acoustically decoupling said housing from the steamer, initiating a seismic source event into the sea to develop a seismic compressional wave therein, resulting in at least one subsurface boundary s-wave reflection, and detecting the subsurface boundary s-wave reflection at at least one of said sensors and converting the detected s-wave reflection to an electrical signal for communications by the marine streamer.

8. The method in accordance with claim 7, wherein said seismic sensors include geophones with velocity sensing elements.

9. The method in accordance with claim 7, wherein the compressional wave initiated into the sea results in at least one subsurface boundary p-wave reflection, and including deploying a plurality of hydrophones along said marine streamer located intermediate the connection points of the housings for sensing at least one subsurface boundary p-wave reflection and converting the detected p-wave reflection to an electrical signal for communications by the marine streamer.

* * * * *